May 22, 1962     J. M. SCHWARTZ     3,035,487
VARIABLE POWER OPTICAL SYSTEM
Filed Feb. 15, 1960

FIG. 1

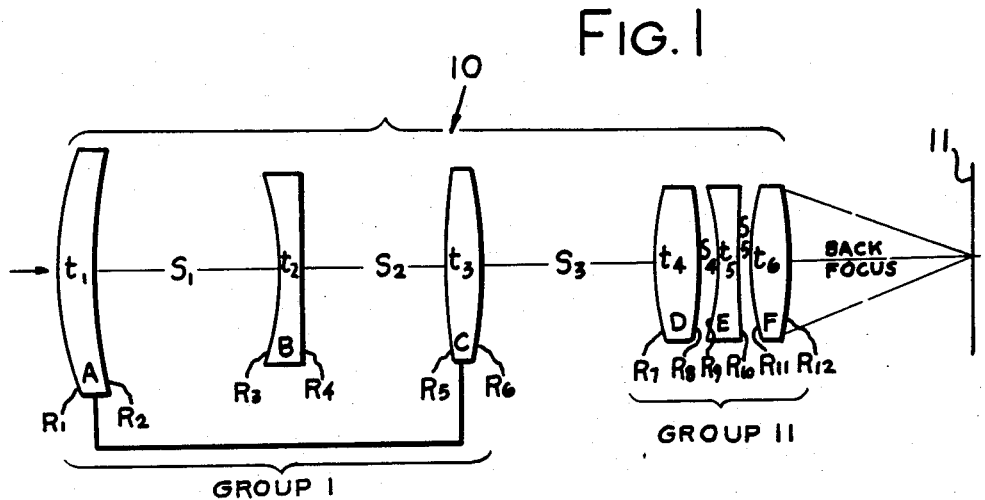

FIG. 2

| OVERALL E.F. = 15.58 to 26.46 | | | | BACK FOCUS = 13.4 APPROX. | | |
|---|---|---|---|---|---|---|
| ZOOMING RANGE = 1.7 APPROX. | | | | RELATIVE APERTURE = $f/1.5$ MAX. | | |
| LENS | FOCAL LENGTH | LENS RADII | THICKNESS | SPACINGS | $n_D$ | V |
| A | $F_1 = 106.01$ | $R_1 = 25.119$ | $t_1 = 2.50$ | $S_1 = 21.5$ (GREATEST m) | 1.5725 | 57.4 |
|   |               | $R_2 = 41.305$ |              | $S_1 = 7.4$ (LEAST m)     |        |      |
| B | $F_2 = -34.87$ | $R_3 = -22.909$ | $t_2 = 1.50$ | $S_2 = 4.0$ (GREATEST m) | 1.657 | 36.6 |
|   |                | $R_4 = \infty$  |              | $S_2 = 18.1$ (LEAST m)   |       |      |
| C | $F_3 = 40.00$ | $R_5 = 63.096$ | $t_3 = 2.50$ | $S_3 = 18.35$ (GREATEST m) | 1.651 | 55.8 |
|   |               | $R_6 = -43.652$ |             | $S_3 = 4.25$ (LEAST m)    |       |      |
| D | $F_4 = 21.67$ | $R_7 = 20.512$ | $t_4 = 3.20$ | $S_4 = 1.2$ | 1.638 | 55.5 |
|   |               | $R_8 = -39.811$ |             |             |       |      |
| E | $F_5 = -19.82$ | $R_9 = -18.365$ | $t_5 = 1.20$ | $S_5 = 0.60$ | 1.7506 | 27.8 |
|   |                | $R_{10} = 80.168$ |             |              |        |      |
| F | $F_6 = 20.14$ | $R_{11} = 20.137$ | $t_6 = 2.60$ |  | 1.612 | 59.5 |
|   |               | $R_{12} = -30.20$ |              |  |       |      | m = SIZE OF IMAGE AT 11

*INVENTOR.*
JOHN M. SCHWARTZ
BY Frank C. Parker
*ATTORNEY*

United States Patent Office 3,035,487
Patented May 22, 1962

3,035,487
VARIABLE POWER OPTICAL SYSTEM
John M. Schwartz, Irondequoit, N.Y., assignor to Bausch & Lomb Incorporated, a corporation of New York
Filed Feb. 15, 1960, Ser. No. 8,730
2 Claims. (Cl. 88—57)

This invention relates to variable power optical systems of the zoom type and more particularly it relates to optically compensated systems wherein the image formed by the system remains at a substantially stationary position during all changes of magnification of the image.

It is an object of this invention to provide a novel variable power optical system of the aforesaid kind which is simple in optical form and mechanical requirements for least manufacturing cost but nevertheless capable of high grade performances at relative apertures as great as $f/1.5$.

A further object of this invention is to provide such an optical system which is optically compensated to maintain the position of the image which is formed thereby at a substantially stationary position during all changes of magnification.

A still further object is to provide such an optical system having two functional groups of lenses in series wherein the residual image errors of one lens group are corrected by compensating residual image errors in the other lens group.

Further objects and advantages reside in the details of construction and arrangement and combination of parts, reference being had, for a complete description, to the specification herebelow and the accompanying drawing wherein:

FIG. 1 is an optical diagram showing a preferred form of my invention; and

FIG. 2 is a table of constructional data related to said optical diagram.

My invention is shown in a preferred form in FIG. 1 of the drawing as a photographic objective, generally designated by numeral 10, which forms an image of an object at an image plane 11 located at the back focus of said objective. This objective may equally well be used as a projection objective wherein a film or other object surface located at said image plane 11 is projected upon a conjugate image receiving surface, not shown.

Said objective 10 is composed of six air spaced single lenses designated A, B, C, D, E, and F named in order from the front thereof when used as a camera objective. These lenses are grouped into two functional groups which each consist of two positive lenses between which is interposed a negative lens, the front group being pancratic for varying the magnification of said image and the rear group serving to transmit the image rays from the front group to the image plane 11 which is located at a substantially constant back focus of about 13.4 mm. to the rear of the last lens. The residual image errors of the front lens group are compensated by the residual image errors of opposite sign of the rear lens group whereby the image formed by the objective is well corrected for spherical and chromatic aberrations and especially for coma, astigmatism, distortion and field curvature for a relative aperture as great as $f/1.5$.

In order to change the magnification of the image, the positive variator lens A is moved axially by suitable means, not shown. For purposes of compensating the axial shifting of the image position during motion of the lens A, the second positive lens C is rigidly connected by any preferred means to lens A for motions in unison therewith, while the negative lens is stationary.

According to this invention, careful calculation and experiment has established that the relationship of power or focal length between the individual lenses in the objective 10 is very important. The best results of said calculation and experiment indicate that the constructional data of the individual lenses should be within the ranges of values given in the table below as follows:

$$.32F_1 < F_2 < .33F_1$$
$$.37F_1 < F_3 < .38F_1$$
$$.20F_1 < F_4 < .21F_1$$
$$.18F_1 < F_5 < .19F_1$$
$$.18F_1 < F_6 < .20F_1$$
$$.55R_2 < R_1 < .70R_2$$
$$.8R_1 < R_3 < 1.0R_1$$
$$R_4 > \pm 5.0F_1$$
$$.62R_5 < R_6 < .76R_5$$

$$2.5\left[n(B) - \frac{n(A)+n(C)}{2}\right] < n(E)$$
$$-\frac{n(D)+n(F)}{2} < 3.0\left[n(B) - \frac{n(A)+n(C)}{2}\right]$$

wherein $n$ designates the refractive index for the D line of the spectrum, $F_1$ to $F_6$ represent the respective focal lengths of the individual lenses A to F, $R_1$ to $R_6$ designate the lens radii as mentioned herebelow.

Furthermore, the values for the radii of curvature of curvature of the refractive surfaces ($R_1$ to $R_{12}$) for the lenses mentioned in the foregoing table, the axial thicknesses ($t_1$ to $t_6$) of said lenses and the air spaces ($S_1$ to $S_5$) between said lenses should be specified according to the following statement of inequalities, wherein $F_1$ designtes the focal length of lens A per se:

$$.21F_1 < R_1 < .26F_1$$
$$.35F_1 < R_2 < .42F_1$$
$$.19F_1 < R_3 < .24F_1$$
$$R_4 > \pm 5.0F_2$$
$$.53F_1 < R_5 < .65F_1$$
$$.37F_1 < R_6 < .44F_1$$
$$.17F_1 < R_7 < .21F_1$$
$$.34F_1 < R_8 < .41F_1$$
$$.15F_1 < R_9 < .20F_1$$
$$.68F_1 < R_{10} < .83F_1$$
$$.17F_1 < R_{11} < .20F_1$$
$$.25F_1 < R_{12} < .31F_1$$
$$.021F_1 < t_1 < .026F_1$$
$$.013F_1 < t_2 < .015F_1$$
$$.021F_1 < t_3 < .026F_1$$
$$.029F_1 < t_4 < .033F_1$$
$$.010F_1 < t_5 < .012F_1$$
$$.021F_1 < t_6 < .028F_1$$
$$.20F_1 < S_1 < .21F_1 \text{ (at greatest } m\text{)}$$
$$.069F_1 < S_1 < .071F_1 \text{ (at least } m\text{)}$$
$$.037F_1 < S_2 < .038F_1 \text{ (at greatest } m\text{)}$$
$$.17F_1 < S_2 < .18F_1 \text{ (at least } m\text{)}$$
$$.17F_1 < S_3 < .18F_1 \text{ (at greatest } m\text{)}$$
$$.040F_1 < S_3 < .041F_1 \text{ (at least } m\text{)}$$

where "$m$" designates the size of the image formed at the image plane 11.

With respect to refractive index of the glass used in the respective lenses A, B, C, D, E and F, it is advantageous to choose glasses such that the difference between the refractive index of the negative lens E and the average refractive index of the positive lenses D and F in the rear lens group is between 2.5 to 3.0 times the corresponding difference between refractive index of the negative lens B and the average refractive index of the positive lenses A and C in the front lens group.

One successful form of this invention is embodied in an objective having a zooming range of approximately 1.7 and a relative aperture as great as $f/1.5$, the constructural details thereof being given in the table of values herebelow. Herein, as above mentioned, the lenses are designated A, B, C, D, E and F named in order from the front or light incident side of the objective, $F_1$, $F_2$, $F_3$, $F_4$, $F_5$, and $F_6$ designate the individual focal lengths of the A, B, C, D, E and F lenses, respectively, $R_1$ to $R_{12}$ designate the radius of curvature of the refractive surfaces of said lenses, $t_1$ to $t_6$ represent the axial thicknesses of the respective lenses, $S_1$ to $S_5$ represent the axial air spaces between the respective lenses and $n_D$ and $\nu$ designate the refractive index and Abbe number, respectively, of the glass in the individual lenses. "$m$" designates the size of the image formed at the image plane 11.

of inequalities wherein $R_1$, $R_2$, $R_3$, $R_4$, $R_5$, $R_6$, $R_7$, $R_8$, $R_9$, $R_{10}$, $R_{11}$ and $R_{12}$ designate the refractive curvatures of the respective lenses named in order from the front of the system $t_1$, $t_2$, $t_3$, $t_4$, $t_5$ and $t_6$ designate the axial thicknesses of the respective lenses, $S_1$, $S_2$, $S_3$, $S_4$ and $S_5$ designate the spaces between the respective lenses, $F_1$ designates the focal length of the foremost positive lens, the difference between the refractive index of the negative lens in the rear lens group and the average value of refractive index for the two positive lenses in the rear lens group being between 2.5 to 3.0 times the corresponding difference in the front lens group, $m$ designates the size of the image,

[Zooming Range = 1.7 approx.  Back Focus = 13.4 approx.  Relative Aperture = $f/1.5$ max.]

| Lens | Focal Length | Curvature | Thickness | Spacing | $n_D$ | $\nu$ |
|---|---|---|---|---|---|---|
| A | $F_1 = 106.01$ | $R_1 = 25.119$ | $t_1 = 2.50$ | | 1.5725 | 57.4 |
| | | $R_2 = 41.305$ | | $S_1 = 21.5$ greatest $m$, $S_1 = 7.4$ least $m$. | | |
| B | $F_2 = -34.87$ | $R_3 = -22.909$ | $t_2 = 1.50$ | | 1.657 | 36.6 |
| | | $R_4 = \infty$ | | $S_2 = 4.0$ greatest $m$, $S_2 = 18.1$ least $m$. | | |
| C | $F_3 = 40.00$ | $R_5 = 63.096$ | $t_3 = 2.50$ | | 1.651 | 55.8 |
| | | $R_6 = -43.652$ | | $S_3 = 18.35$ greatest $m$, $S_3 = 4.25$ least $m$. | | |
| D | $F_4 = 21.67$ | $R_7 = 20.512$ | $t_4 = 3.20$ | | 1.638 | 55.5 |
| | | $R_8 = -39.811$ | | $S_4 = 1.2$. | | |
| E | $F_5 = -19.82$ | $R_9 = -18.365$ | $t_5 = 1.20$ | | 1.7506 | 27.8 |
| | | $R_{10} = 80.168$ | | $S_5 = 0.60$. | | |
| F | $F_6 = 20.14$ | $R_{11} = 20.137$ | $t_6 = 2.60$ | | 1.612 | 59.5 |
| | | $R_{12} = -30.20$ | | | | |

"$m$" designates the size of said image.

It will be seen that there is here provided an objective which is simple in form and structure for advantageous low cost manufacture and which is well corrected for coma, Petzval condition and other image aberrations mentioned heretofore, all in fulfillment of the objects of this invention.

Although but one form of this invention has been shown and described in detail, it is to be understood that other forms are possible and changes may be made in the detailed structure thereof without departing from the spirit of this invention as defined in the claims here appended.

I claim:

1. A zoom type of variable power objective having a relative aperture as great as $f/1.5$ and composed of a front and a rear group of three single lenses each of which are arranged in spaced relation and optical alignment with each other, the residual image errors in the front lens group being substantially equal and opposite to the residual image errors of the rear lens group to produce a final image which is well corrected for spherical and chromatic aberrations, coma, astigmatism, distortion and field curvature, each said group being composed of a front and a rear positive lens and an interposed negative lens between said positive lenses, the positive lenses of only the front lens group being axially movable and rigidly connected together for movements in unison to vary the magnification of a final image which remains substantially stationary for all magnifications thereof, the variable focal length of the front lens group varying between 3.2 and 5.5 times the fixed focal length of the rear lens group corresponding to the magnification range of substantially 1.7 of said image, certain constructional data for said objective being given by the following table of inequalities $.21F_1 < R_1 < .26F_1$
$.35F_1 < R_2 < .42F_1$
$.19F_1 < R_3 < .24F_1$
$R_4 = \infty$
$.53F_1 < R_5 < .65F_1$
$.37F_1 < R_6 < .44F_1$
$.17F_1 < R_7 < .21F_1$
$.34F_1 < R_8 < .41F_1$
$.15F_1 < R_9 < .20F_1$
$.68F_1 < R_{10} < .83F_1$
$.17F_1 < R_{11} < .20F_1$
$.25F_1 < R_{12} < .31F_1$
$.021F_1 < t_1 < .026F_1$
$.013F_1 < t_2 < .015F_1$
$.021F_1 < t_3 < .026F_1$
$.029F_1 < t_4 < .033F_1$
$.010F_1 < t_5 < .012F_1$
$.021F_1 < t_6 < .028F_1$
$.20F_1 < S_1 < .21F_1$ (for greatest $m$)
$.069F_1 < S_1 < .071F_1$ (for least $m$)
$.037F_1 < S_2 < .038F_1$ (for greatest $m$)
$.17F_1 < S_2 < .18F_1$ (for least $m$)
$.17F_1 < S_3 < .18F_1$ (for greatest $m$)
$.04F_1 < S_3 < .041F_1$ (for least $m$)

wherein "$m$" designates the size of said image.

2. An optically compensated zoom type of variable power optical objective having a relative aperture as great as $f/1.5$ and composed of two groups of lenses which cooperatively form a well corrected image regarding spherical and chromatic aberrations, coma, astigmatism, distortion and field curvatures, each lens group consisting of a front and a rear positive lens and a negative lens interposed between the positive lenses, the positive lenses in the foremost lens group being rigidly connected together for axial movements in unison, the constructional data for said objective being specified by the table given herebelow wherein $R_1$ to $R_{12}$ designate the radius of curvature of the refractive surfaces, $t_1$ to $t_6$ designate the axial thicknesses of the respective lenses, $S_1$ to $S_5$ designate the air spaces between said lenses, $F_1$ to $F_6$ designate the focal lengths of the individual lenses, $n_D$ and $\nu$ represent, respectively, the refractive index and the Abbe number of the optical materials used in the lenses,

[Zooming Range = 1.7 approx. Range of Focal Length = 15.6 to 26.5 mm. Relative Aperture = $f/1.5$ max.]

| Lens | Focal Length | Curvature | Thickness | Spacing | $n_D$ | $\nu$ |
|---|---|---|---|---|---|---|
| A | $F_1=106.01$ | $R_1=25.119$<br>$R_2=41.305$ | $t_1=2.50$ | | 1.5725 | 57.4 |
| | | | | $S_1=21.5$ greatest $m$;<br>$S_1=7.4$ least $m$. | | |
| B | $F_2=-34.87$ | $R_3=-22.909$<br>$R_4=\infty$ | $t_2=1.50$ | | 1.657 | 36.6 |
| | | | | $S_2=4.0$ greatest $m$;<br>$S_2=18.1$ least $m$. | | |
| C | $F_3=40.00$ | $R_5=63.096$<br>$R_6=-43.652$ | $t_3=2.50$ | | 1.651 | 55.8 |
| | | | | $S_3=18.35$ greatest $m$;<br>$S_3=4.25$ least $m$. | | |
| D | $F_4=21.67$ | $R_7=20.512$<br>$R_8=-39.811$ | $t_4=3.20$ | | 1.638 | 55.5 |
| | | | | $S_4=1.2$. | | |
| E | $F_5=-19.82$ | $R_9=-18.365$<br>$R_{10}=80.168$ | $t_5=1.20$ | | 1.7506 | 27.8 |
| | | | | $S_5=0.60$. | | |
| F | $F_6=20.14$ | $R_{11}=20.137$<br>$R_{12}=-30.20$ | $t_6=2.60$ | | 1.612 | 59.5 |

"$m$" designates the size of said image.

References Cited in the file of this patent

UNITED STATES PATENTS

| | | |
|---|---|---|
| 2,718,817 | Back et al. | Sept. 27, 1955 |
| 2,732,763 | Back et al. | Jan. 31, 1956 |
| 2,741,947 | Back | Apr. 17, 1956 |
| 2,913,957 | Back | Nov. 24, 1959 |
| 2,983,194 | Miles | May 6, 1961 |

UNITED STATES PATENT OFFICE
CERTIFICATE OF CORRECTION

Patent No. 3,035,487            May 22, 1962

John M. Schwartz

It is hereby certified that error appears in the above numbered patent requiring correction and that the said Letters Patent should read as corrected below.

Column 2, lines 27 and 28, strike out "of curvature", second occurrence; line 37, for "$\pm 5.0 F_2$" read -- $\pm 5.0 F_1$ --.

Signed and sealed this 2nd day of October 1962.

(SEAL)
Attest:

ERNEST W. SWIDER
Attesting Officer

DAVID L. LADD
Commissioner of Patents